March 6, 1928.

T. OAKES ET AL 1,661,846

APPARATUS FOR SEVERING GLASS SHEETS

Filed March 18, 1926   8 Sheets-Sheet 2

Fig. 2.

INVENTORS
Travis Oakes
Albert C. Oakes
by James C. Bradley
Atty.

March 6, 1928.  1,661,846

T. OAKES ET AL

APPARATUS FOR SEVERING GLASS SHEETS

Filed March 18, 1926  8 Sheets-Sheet 4

INVENTORS
Travis Oakes
A. L. Oakes
by James C. Bradley

March 6, 1928. 1,661,846

T. OAKES ET AL

APPARATUS FOR SEVERING GLASS SHEETS

Filed March 18, 1926 8 Sheets-Sheet 7

Fig. 7.

INVENTORS
Travis Oakes
Albert C. Oakes
by James C. Bradley
atty

March 6, 1928.

T. OAKES ET AL 1,661,846

APPARATUS FOR SEVERING GLASS SHEETS

Filed March 18, 1926    8 Sheets-Sheet 8

Fig. 9.

INVENTORS
T. Oakes and
A. C. Oakes
by
James C. Bradley
Atty.

Patented Mar. 6, 1928.

1,661,846

UNITED STATES PATENT OFFICE.

TRAVIS OAKES AND ALFRED C. OAKES, OF MOUNT VERNON, OHIO, ASSIGNORS TO PITTSBURGH PLATE GLASS COMPANY, A CORPORATION OF PENNSYLVANIA.

APPARATUS FOR SEVERING GLASS SHEETS.

Application filed March 18, 1926. Serial No. 95,626.

This invention relates to apparatus for automatically severing or separating glass sheets from a continuously formed ribbon and constitutes an improvement upon, or more exactly, an addition to the patent of H. G. Slingluff No. 1,373,533 of April 5, 1921, and to the patent of Travis Oakes No. 1,587,547 of June 8, 1926. In the use of said apparatus, the heated ribbons for severing the glass sheets from the continuously formed ribbon are controlled by switches operated by hand, and the air chilling means for starting the crack along the line of heating is controlled by a foot valve, as the operator holds the sheet with both hands to prevent it from falling to the floor, while the severing operation is performed.

The present invention is designed to relieve the operator of the task of operating the severing controls and holding the sheet during the severing operation, as well as removing the sheet out of the path of the oncoming continuous ribbon and holding it in suspension until the operator can place it on the rack. This reduces the work of the operator to a minimum and under favorable running conditions, one operator can take care of two machines.

The automatic severing is preferably accomplished by means of a limit switch, operated by the top of the continuous ribbon, as it is drawn up through the machine. This limit switch operates a magnetic control switch that closes the circuit to a small motor. This same switch also closes the circuit to the main switchboard, which carries the switches for operating the ribbon clamp, the heating ribbons, and the valve for controlling the air chilling means, as well as the limit switch for stopping the automatic cycle. When the limit switch is closed, the motor is started and by means of a suitable reduction, it drives a cam shaft on which is located the cams for operating the different switches for automatically severing the glass and stopping the cycle.

Holding the glass during the severing operation and removing it from the path of the oncoming ribbon, is accomplished by means of an electrically operated clamp, counterweighted and suspended over the machine in such a way that after severing, it throws the sheet out a short distance to the front, so it will clear the continuous ribbon coming up the through the machine. The switch for controlling this clamp is actuated by the operator's thumb during the operation of placing it over the top of the continuous ribbon, and is released in the same manner as he holds the sheet of glass firmly with both hands as the clamp releases it. After which he places the glass on a portable rack or truck. One embodiment of the invention is illustrated in the accompanying drawings, wherein:

Figure 1:
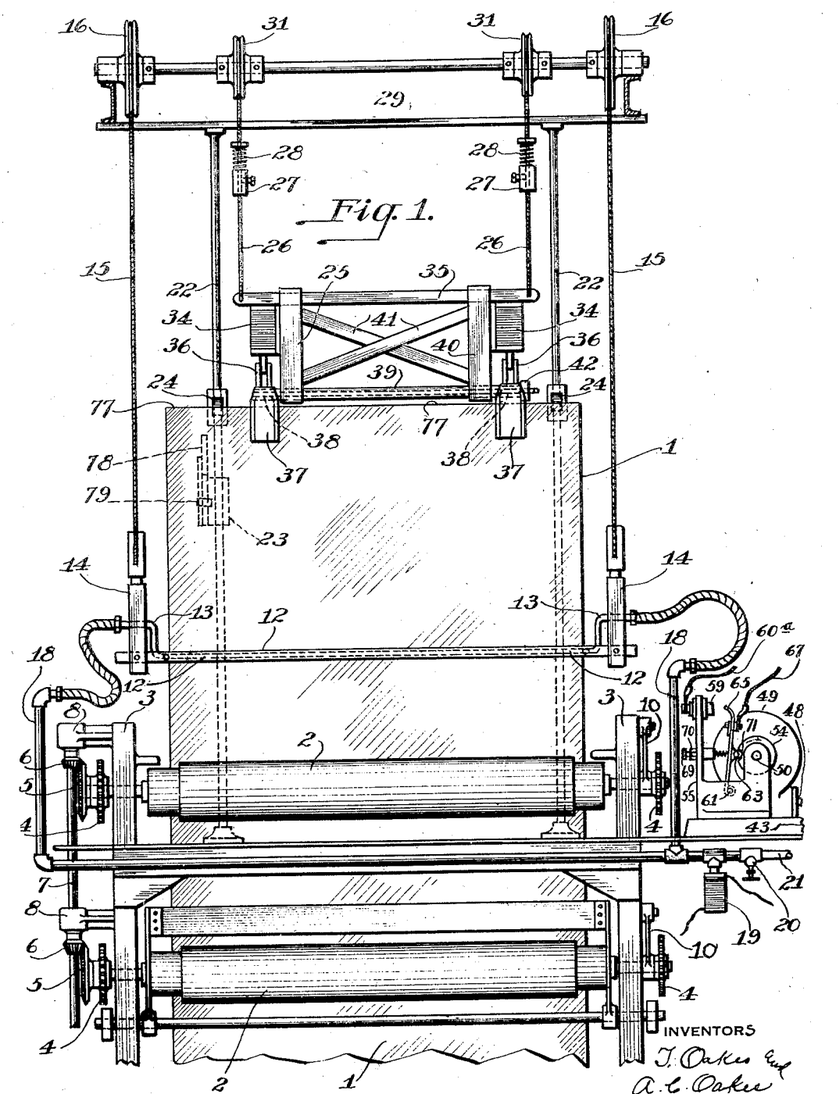
Figure 1 is a front view of the apparatus showing the relative positions of the vertical continuous drawing machine top, the glass clamp, the severing means, and the automatic control unit for automatically severing the sheets from the continuously drawn ribbon.
Figure 2:
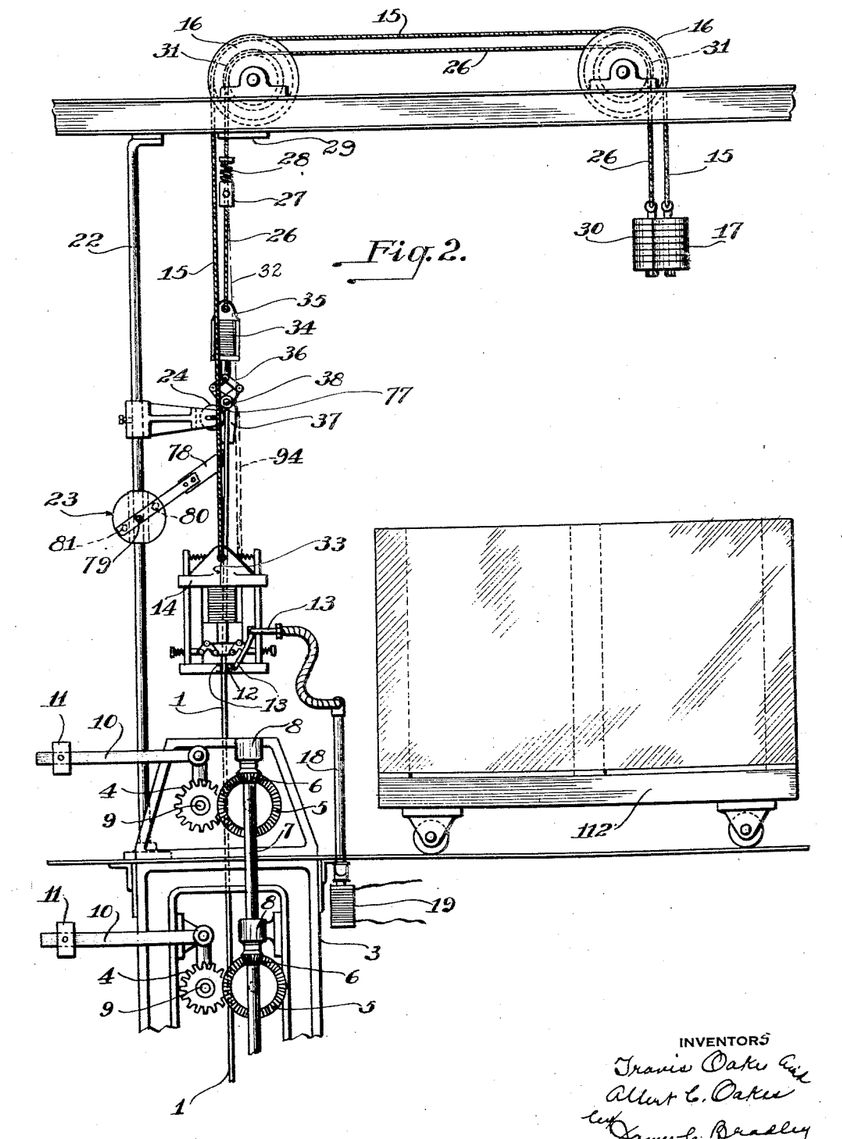
Fig. 2 is an end view showing the means for supporting and adjusting the limit switch, snapping rolls, the counterweighted heating ribbon and glass clamp, as well as the location of the sheet as it is held in suspension after severing.

Referring to Fig. 1, 1 is the continuously formed ribbon coming up through the machine rolls 2, 2, supported by the machine frame 3, 3 and driven by the sprockets 4, 4, the bevel gears 5, 5 and the bevel pinions 6, 6, keyed to the vertical drive shaft 7 supported on the side of the machine frame 3 in the bearings 8, 8. Other rolls in opposition to the rolls 2, 2, carried on the shafts 9, 9, (but not shown) and driven by the sprockets 4, 4, shown in Fig. 2, are suspended on the bell cranks 10, 10 (Fig. 2) and are counterweighted in order to vary the pressure on the glass ribbon by the weights 11, 11 so as to provide a means for allowing large pieces of glass or bent sheets to come up through the machine. The drive for the drawing machine is mounted below and is not shown. 12, 12 are the heating ribbons and can travel with the glass sheet. 13, 13 are the air nozzles carried on the ribbon clamping frames 14, 14, and set in position so that the jets of air will follow the line of heating after the ribbons have been released from the sheet. 15, 15 are the cables for supporting the ribbon clamps; 16, 16 the guide rollers for the cable; and 17 the counterweights for balancing the heating unit. 18, 18 are the air pipes to the nozzles; 19 the magnetic operated valve for controlling the air supplied to the nozzles; 20 the regulating valve, and 21 the main air line. 22, 22 are posts for carrying the limit switch 23 and sheet snapping rolls 24, 24. These rolls push the upper part of the continuous ribbon out to the right (Fig. 2) toward the operator, thus creating a bending strain in the glass sheet or ribbon, so that when the air is applied along the line of heating, the sheet is immediately snapped off and carried up and out by the electrically operated clamp 25. The clamp 25 is supported by the cables 26, 26 provided with the buffer blocks 27, 27 and the springs 28, 28 that bump against the cross bar 29 as the counterweights 30 (Fig. 2) tend to pull the clamp and sheet up after severing. The counterweights are attached to the end of the cables 26, 26, passing over the guide rollers 31, 31 and suspended over the drawing machine so that the center line of the clamp 25 marked 32 (Fig. 2) is offset from the center line of the machine 33. This type of suspension causes the sheet, when severed to swing out toward the operator and up so that it will clear the oncoming ribbon. The bumper blocks 27, spring 28 and cross bar 29 form a means for adjusting the vertical travel of the sheet after severing, as well as providing a cushioning effect to overcome the jar caused by the dropping counterweight 30, thus reducing any breakage to a minimum. The clamp 25 is operated by means of solenoids 34, 34, bolted to the beam 35 and connected to the end of the clamps by means of the links 36. The clamp jaws 37 are pivoted at 38 on the end of a cross bar 39, secured rigidly to the supporting beam 35 by means of the straps 40 and the diagonals 41. The toggle switch 42, for controlling the flow of current through the solenoid windings 34, is mounted on the end of the pivot 38 so that the operator can hold the sheet of glass and operate the switch with his thumb. The clamp jaws are lined with asbestos cloth and are held open by the weight of the solenoid cores and closed by the application of the current through the control switch 42.

Figure 3:
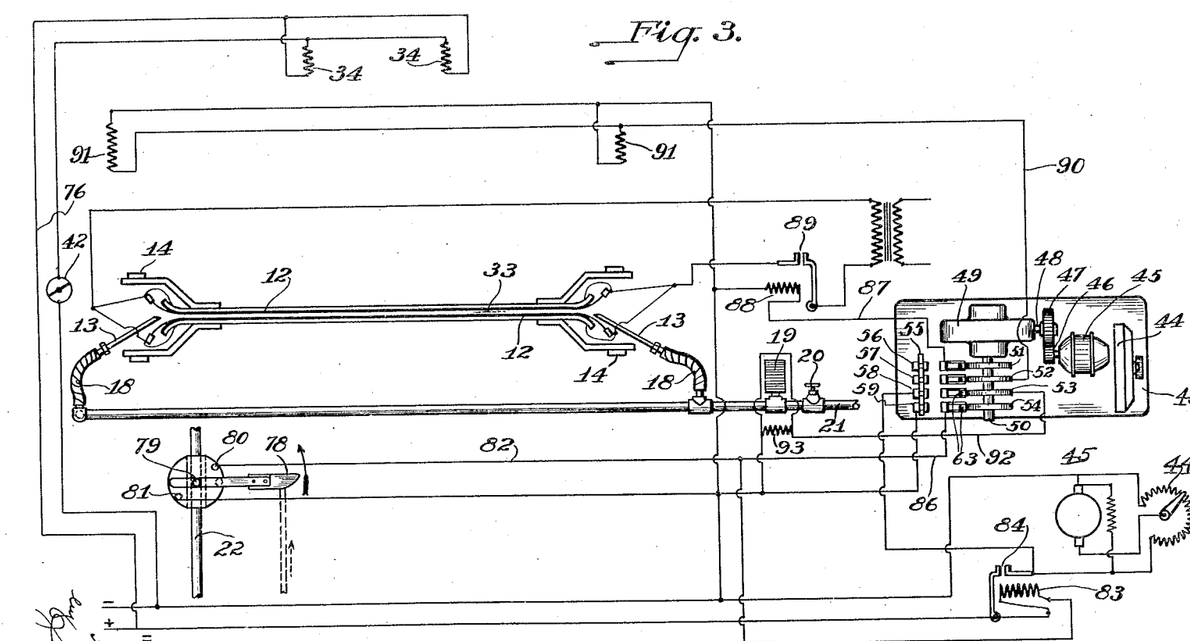
Fig. 3 is a diagrammatic plan view of the apparatus showing the arrangement of the different parts and their respective wiring for performing the severing operation.

Referring to Figs. 1 and 3, 43 is a base plate for carrying the automatic control unit. 44 is a rheostat for governing the speed of the drive motor 45; and by this means the time required for performing the severing operation may be lengthened or shortened to suit the varying thicknesses and different conditions of the glass ribbon. For the sake of clearness, Fig. 3 shows not only the motor 45 and rheostat 44, but also the wiring diagram including such parts; these parts thus being shown twice on the one figure. 46 is the motor pinion, 47 a gear keyed to the worm reducer shaft 48, and 49 the worm reducer. 50 is the cam shaft that carries the ribbon heat control cam 51, ribbon clamp cam 52, air cam 53, and limit cam 54. In this arrangement the cam shaft 50 and the cams 51, 52, 53 and 54 make one complete revolution during the severing operation, after which it remains set until the cycle is started again by the limit switch 23.

Figure 4:
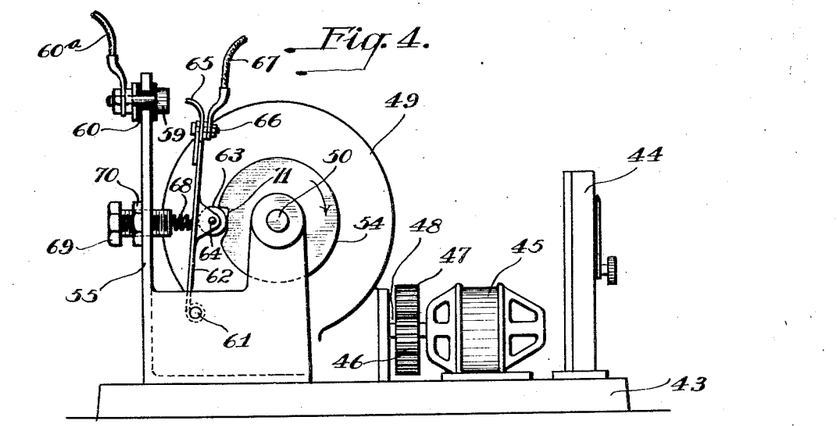
Fig. 4 is an enlarged end view of the main switchboard and also shows the different cams in their respective positions during the severing cycle.

Referring to Fig. 1, Fig. 3 and Fig. 4, 55 is the main switchboard and carries three terminals connected in series; namely, the terminal 56 for operating the ribbon heat, the terminal 57 for operating the ribbon clamping, and the terminal 58 for operating the air valve. A fourth terminal 59 is connected in the limit switch circuit. Referring to Fig. 4, 59 is the limit switch terminal, 60 the insulators, 60ª the cable, 61 the pivot on which the contact finger swings, 62 the contact finger, 63 the cam roller, 64 the roller pivot, 65 the contactor, 66 the other terminal, 67 the cable, 68 the spring for breaking the contact and keeping the roller 63 in contact with the cam 54. 69 the adjusting bolt for varying the tension in the spring 68, and 70 the lock nut for locking it in position. The switches for operating the ribbon heat, the ribbon clamp, and the air are the same as the one just described, but by referring to Fig. 4, the shapes of the cams necessary to operate the different switches for performing the severing operation will be easily understood. The cams rotate in the direction of the arrows. The limit cam 54 has a small notch 71 cut in the periphery for breaking the contact, then after the motor is started, the circuit is immediately closed and held closed for one complete cycle. The ribbon heat cam 51 has two notches 72 and 73 cut in the periphery by which the current is applied to the ribbon intermittently. The ribbon clamp cam 52 has one large notch 74 cut in the periphery and holds the heating ribbon clamped until the glass is ready for applying the air. The air cam 53 has a small hump 75 on the periphery and is designed so that quick opening and closing of the air valve can be obtained. The cams are shown in Fig. 4, in their approximate locations in respect to their contact finger rollers mounted in the main switch 55.

The limit switch 23 and the snapping rolls 24, 24 are located along the posts 22, 22 to suit the required size of sheets to be severed from the continuous ribbon coming up through the machine on the center line 33. The clamp 25 is pushed down over the top of the ribbon by the operator and clamped by the operator throwing the toggle switch 42 with his thumb. This completes the circuit 76 through the solenoids 34, 34, illustrated in Fig. 3. The ribbon with the clamp clamped on top continues to travel vertically until the top edge 77 (Fig. 1) comes in contact with the finger 78 on the limit switch 23. As the finger is pushed up, it rotates about the center 79. The contacts 80, 81 are connected, thus closing the circuit 82 which energizes the magnet 83, closing the switch 84, and starting the control motor 45, which drives the cams for operating the control switches. At the time of closing the switch 84, current is supplied to the terminals 56, 57, 58, placing them in position for performing their part in the cycle. The speed of the motor 45 is varied by the rheostat 44 through the arrangement of wiring shown in Fig. 3. As the cam shaft 50 rotates, the limit switch 59 is first closed by the cam 54, thus closing a secondary circuit 86 that continues to energize the magnet 83 and hold the switch 84 closed although the limit switch 23 is thrown out of use. This also puts the circuit in position so that the cycle can be stopped by breaking the contact 59. The cam 51 closes the switch 56, thus closing the circuit 87, which energizes the magnet 88, closing the switch 89 and starting the heating of the severing ribbons before clamping them to the sheet, this heating operation being usually applied intermittently to allow the heat to be absorbed by the glass slowly. The cam 52 then closes the switch 57, thus closing the circuit 90 which energizes the solenoids 91, 91 carried in the frame 14, 14 that clamps the heating ribbons 12 to the continuously formed glass sheet or ribbon 1. The heating circuit 87 and the clamping circuit 90 are held closed for a period of time set by experience and governed by the thickness of the sheet being severed. They are then broken by the rotating cams 51, 52, thus turning the ribbon current off and releasing the ribbon clamp. The cam 53 then closes the switch 58, thus closing the circuit 92, which energizes the magnet 93 controlling the air valve 19. After the air cooling is applied transversely along the line of heating, caused by the ribbons 12, the glass is severed by the quick chill and the bending stress applied by the rolls 24. This completes the cycle and the switch 59 is then opened by means of the cam 54, thus breaking the circuit 86 and stopping the operation of the motor 45. The severed glass sheet which is now hanging in the position shown by dotted lines 94 (Fig. 2) is then removed by the operator as before described and placed on a portable rack or truck. The clamp 25 is now placed over the top of the continuously formed vertical ribbon clamped and made ready for the next sheet severing cycle.

Figure 5:
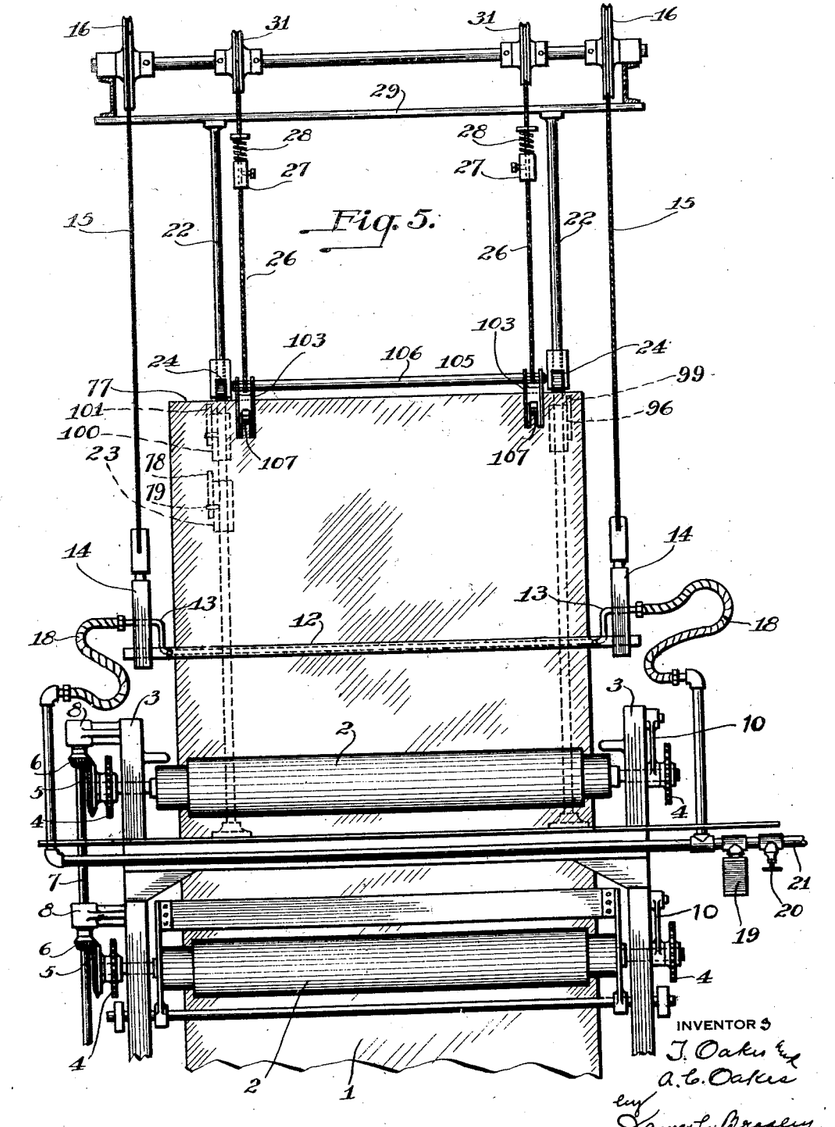
Fig. 5 is a front elevation showing a modification.
Figure 6:
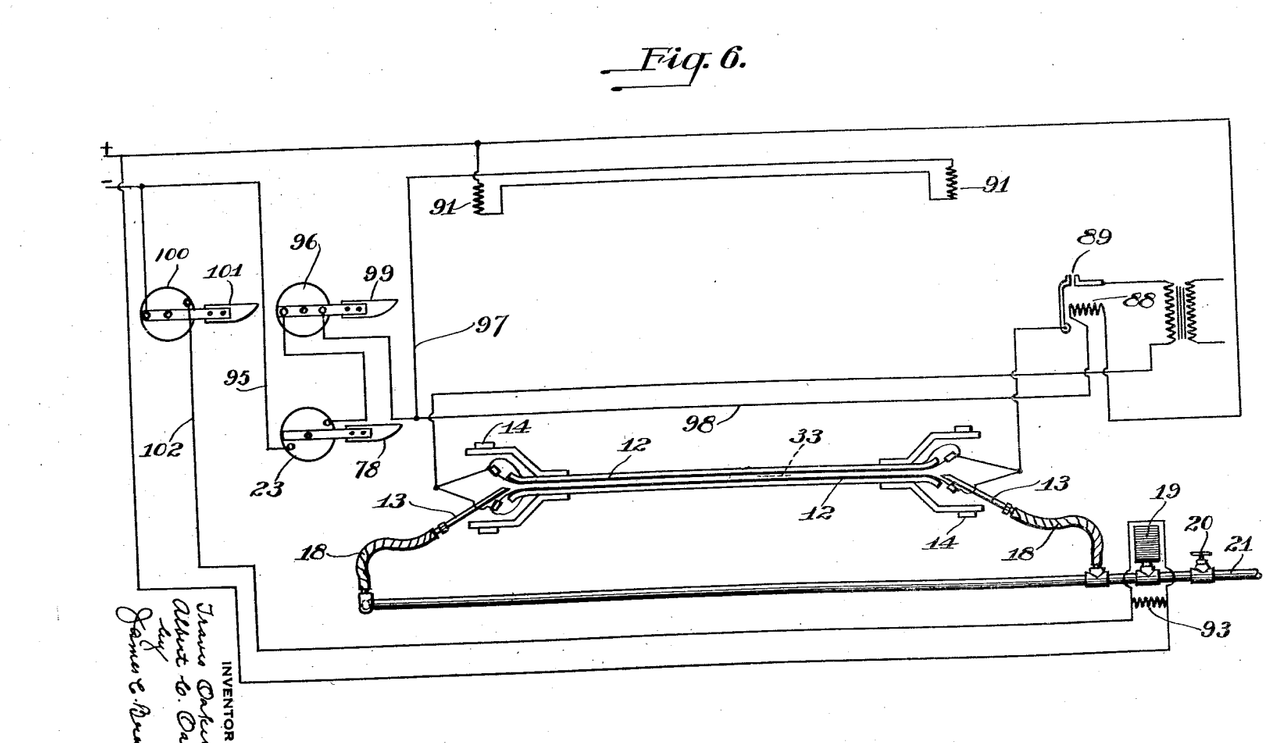
Fig. 6 is a diagrammatic plan view showing the wiring diagram of the Fig. 5 construction.
Figure 7:
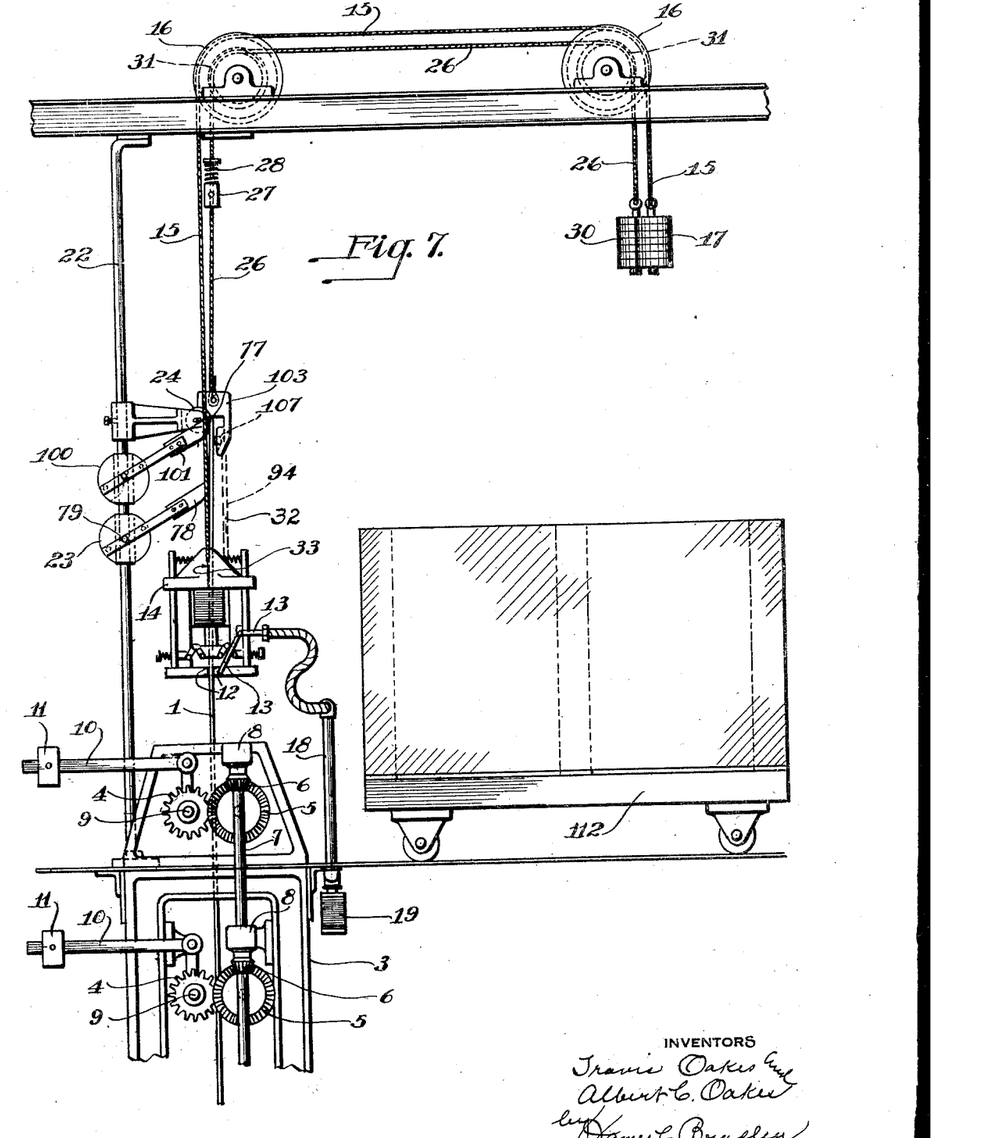
Fig. 7 is a side elevation of the Fig. 5 construction.

Referring to Figs. 5, 6 and 7, the relative positions of the severing apparatus are the same as illustrated in Figs. 1, 2 and 3. The limit switch 23 is operated by the top of the ribbon 77, thus closing the circuit 95 through the limit switch 23 to the tripping switch 96. After the circuit 95 leaves the switch 96, it is divided, one circuit 97 being used to energize the solenoids 91 for clamping the heating ribbons on the continuously drawn sheet, and the other circuit 98 being used for energizing the magnet 88 to close the switch 89 used to control the heating of the glass severing ribbons 12. After the switch 23 is closed by means of the arm 78, the sheet continues to travel vertically until the top 77 lifts the arm 99 on the tripping switch 96 mounted on the right hand post 22. This breaks the circuit 95, thus releasing the heating ribbons from the glass ribbon and turning off the heating means. Mounted on the left hand post 22, and working at the same time as the arm 99 is the air switch 100 operated from the top of the glass ribbon 77 by the arm 101. The switch 100 closes the circuit 102, thus energizing the magnet 93, opening the valve 19, thus applying the air for severing the sheet from the top of the continuously formed ribbon. The arms 78, 99, 101 drop back, and place the switches 23, 96, 100 into operating position after the snapping rollers 24, 24 push the plate out and sever it, the clamp 103 holding it in suspension at 94 until removed.

Figure 8:
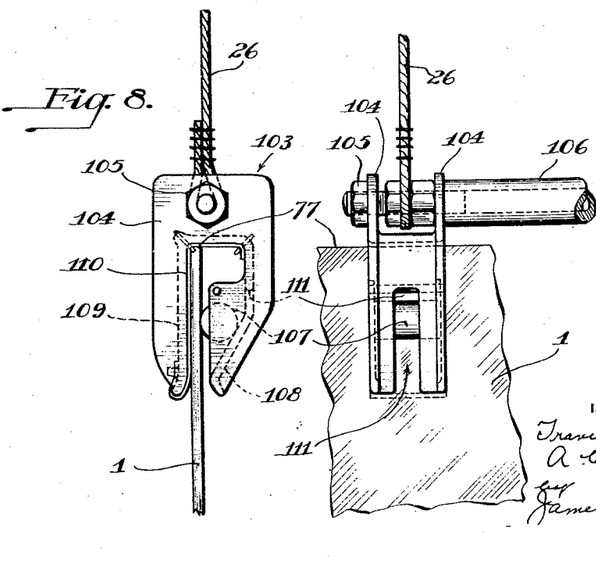
Fig. 8 comprises a side elevation and front view of the clamp employed with the Fig. 5 construction.

Referring to Figs. 5, 7 and 8, the clamp 103 consists of two roller clamps 104 (Fig. 8) tied together by the bolt 105, spaced by the pipe 106, and suspended to the cables 26, 26. The glass is held in the clamps 104 by means of the rubber covered rollers 107, rolling down the slope 108 by gravity. The side of the clamp 109 opposite the rollers 107 is lined with soft rubber 110. The clamp is pushed down over the top of the ribbon 77 and the roller 107 rolls down against the sheet 1, thus gripping it in the clamp. After severing the sheet of glass is lifted upward and swings outward, and the weight of the sheet increases the clamping action. The clamp 103 is released from the sheet as the operator holds it tightly with both hands by lifting the sheet a little and running his thumbs through the slot 111, thus lifting the roller up and away from the sheet. This relieves the clamping action and allows the operator to remove the sheet from the clamp and place it on the rack 112. The clamp is again placed over the top of the ribbon in position for holding another sheet.

Figure 9:
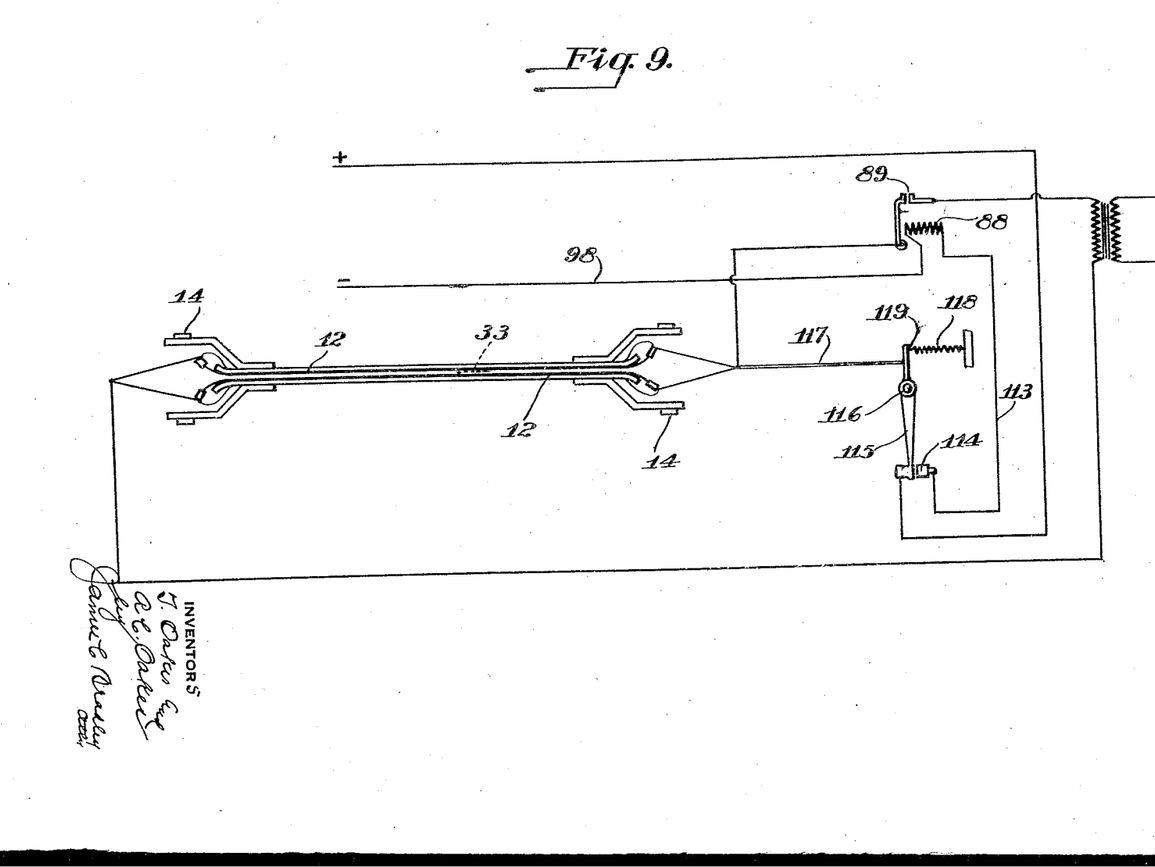
Fig. 9 is a diagrammatic plan view showing a further modification in the wiring diagram.

Fig. 9 is an illustration of a control for the heating ribbon whereby the heating means can be controlled or applied intermittently. Referring to this figure, 12 is the glass heating ribbon, 88 the magnet, energized by closing the switch 23, and 89 the switch which controls the flow of current to the heating ribbons 12. The flow of current to the heating ribbon is turned on and off by means of the secondary magnet circuit 113, which passes through the contact switch 114. This switch is of the quick make and break type and is operated by means of the contact finger 115, pivoted at 116 and connected to the end of the heating ribbons by the expansion link 117. Under normal heating conditions, the switch 114 is closed, but as the ribbons 12 get hot, the expansion link 117 is also heated, thus expanding and lengthening the link 117. This expansion is taken up by the spring 118 attached to the end 119 of the contact finger 115 which oscillates on the pivot 116 pulling the switch 114 open, thus releasing the magnet 88 and opening 89, thereby shutting off the current to the heating ribbon. After the ribbon cools a little, the expansion link 117 contracts, and closes the switch 114, energizing the magnet 88 which closes the switch 89, turning the current through the heating ribbons 12. An intermittent heating of the ribbons has been found ordinarily to give better results than a continuous application of heat, although both methods may be employed with success.

What we claim is:

1. An apparatus for separating sections from a continuously formed advancing sheet of glass, comprising electric heating means extending transversely of the sheet, means for clamping the heating means against the sheet so that it moves along with the sheet during the heating operation, and means actuated by the movement of the sheet for causing the clamping means to be actuated.

2. An apparatus for separating sections from a continuously formed advancing sheet of glass, comprising electric heating means extending transversely of the sheet, means for clamping the heating means against the sheet so that it moves along with the sheet during the heating operation, means actuated by the movement of the sheet for causing the clamping means to be actuated, and automatic means for causing the release of the clamping means after a predetermined interval.

3. An apparatus for separating sections from a continuously formed advancing sheet of glass, comprising electric heating means extending transversely of the sheet, means for clamping the heating means against the sheet so that it moves along with the sheet during the heating operation, means actuated by the movement of the sheet for causing the clamping means to be actuated, automatic means for causing the release of the clamping means after a predetermined interval, and automatically operated means for causing the application of a cooling fluid to the glass beneath said heating means following the release of the clamping means.

4. An apparatus for separating sections from a continuously formed advancing sheet of glass, comprising electric heating means extending transversely of the sheet, means for clamping the heating means against the sheet so that it moves along with the sheet during the heating operation, means actuated by the movement of the sheet for causing the clamping means to be actuated, automatic means for causing the release of the clamping means after a predetermined interval, automatically operated means for causing the application of a cooling fluid to the glass beneath said heating means following the release of the clamping means, and means for applying pressure to the glass at right angles to its line of movement to crack it off after the application of said cooling fluid.

5. An apparatus for separating sections from a continuously formed advancing sheet of glass, comprising electric heating means extending transversely of the sheet, means for clamping the heating means against the sheet so that it moves along with the sheet during the heating operation, means actuated by the movement of the sheet for causing the clamping means to be actuated, automatic means for causing the relase of the clamping means after a predetermined interval, automatically operated means for causing the application of a cooling fluid to the glass beneath said heating means following the release of the clamping means, means for applying pressure to the glass at right angles to its line of movement to crack it off after the application of said cooling fluid, and supporting means moving with the glass for supporting the section which is broken off.

6. An apparatus for separating sections from a continuously formed advancing sheet of glass, comprising electric heating means extending transversely of the sheet, means for clamping the heating means against the sheet so that it moves along with the sheet during the heating operation, means actuated by the movement of the sheet for causing the clamping means to be actuated, automatic means for causing the release of the clamping means after a predetermined interval, automatically operated means for causing the application of a cooling fluid to the glass beneath said heating means following the release of the clamping means, means for applying pressure to the glass at right angles to its line of movement to crack it off after the application of said cooling fluid, and supporting means moving with the glass for supporting the section which is broken off, said last means being arranged to move said section out of alignment with the oncoming glass following said section.

7. An apparatus for separating sections from a continuously formed advancing sheet of glass, comprising electric heating means extending transversely of the sheet, means for clamping the heating means against the sheet so that it moves along with the sheet during the heating operation, means actuated by the movement of the sheet for causing the clamping means to be actuated, contact means for making and breaking the circuit through the heating means, and means for automatically opening and closing the said contact means at predetermined intervals.

8. An apparatus for separating sections from a continuously formed advancing sheet of glass, comprising electric heating means extending transversely of the sheet, means for clamping the heating means against the sheet so that it moves along with the sheet during the heating operation, means actuated by the movement of the sheet for causing the clamping means to be actuated, and means for automatically securing the application of electric current through the heating means, and for interrupting the flow of such current after a predetermined interval has elapsed.

9. An apparatus for separating sections from a continuously formed advancing sheet of glass, comprising electric heating means extending transversely of the sheet, means for clamping the heating means against the sheet so that it moves along with the sheet during the heating operation, means actuated by the movemment of the sheet for causing the clamping means to be actuated, means for automatically securing the application of electric current through the heating means, automatic means for causing the release of the clamping means after a predetermined interval, and means for automatically interrupting the flow of current through the heating means at the end of a predetermined interval.

10. An apparatus for separating sections from a continuously formed advancing sheet of glass, comprising electric heating means extending transversely of the sheet, means for clamping the heating means against the sheet so that it moves along with the sheet during the heating operation, means actuated by the movement of the sheet for causing the clamping means to be actuated, automatic means for causing the release of the clamping means after a predetermined interval, and automatically operated means for causing the application of a cooling fluid to the glass beneath said heating means following the release of the clamping means, the controlling means for said clamping means, and for said releasing means, and for said means for applying a cooling fluid to the glass comprising a motor and switches actuated thereby and operating in a cycle started by said movement of the sheet.

11. An apparatus for separating sections from a continuously formed advancing sheet of glass, comprising electric heating means extending transversely of the sheet, means for clamping the heating means against the sheet so that it moves along with the sheet during the heating operation, means actuated by the movement of the sheet for causing the clamping means to be actuated, automatic means for causing the release of the clamping means after a predetermined interval, and automatically operated means for causing the application of a cooling fluid to the glass beneath said heating means following the release of the clamping means, the controlling means for said clamping means, and for said releasing means, and for said means for applying a cooling fluid to the glass comprising a motor and switches actuated thereby and operating in a cycle under the control of a limit switch closed by said movement of the sheet.

12. An apparatus for separating sections from a continuously formed vertically moving sheet of glass, comprising electric heating means extending transversely of the sheet, means for clamping the heating means against the sheet so that it moves along with the sheet during the heating operation, a counterweighted clamp for engaging the upper edge of the sheet for supporting the top section thereof after it is broken off, and roller means positioned so as to engage the upper portion of said section and apply pressure at right angles to its line of movement to secure its automatic cracking off after the application of the heating means to the glass, said counterweighted clamp being suspended on one side of the line of movement of the glass sheet, so that after the said section is cracked off, it will move by gravity to one side of the plane of the oncoming sheet.

In testimony whereof, we have hereunto subscribed our names this 26th day of Feb'y, 1926.

TRAVIS OAKES.
ALFRED C. OAKES.